May 21, 1968 T. D. WILLIAMS 3,384,379

AUTOMATIC RECORD CHANGER

Filed Feb. 13, 1967 3 Sheets-Sheet 1

Inventor
T. D. WILLIAMS
By
Holcombe, Wetherill & Brisebois
Attorneys

Inventor
T. D. WILLIAMS
By
Holcombe, Wetherill & Brisebois
Attorneys

May 21, 1968 T. D. WILLIAMS 3,384,379

AUTOMATIC RECORD CHANGER

Filed Feb. 13, 1967 3 Sheets-Sheet 3

Inventor

T. D. WILLIAMS

By

Holcombe, Wetherill & Brisebois

Attorneys

United States Patent Office 3,384,379

Patented May 21, 1968

3,384,379

AUTOMATIC RECORD CHANGER

Thomas Douglas Williams, Billericay, England, assignor to The Magnavox Electronics Company Limited, Barking, Essex, England, a British company Filed Feb. 13, 1967, Ser. No. 615,560
Claims priority, application Great Britain, July 25, 1966, 33,376/66
5 Claims. (Cl. 274—10)

ABSTRACT OF THE DISCLOSURE

An automatic record changer has a turntable and a change-cycle mechanism which is driven by the turntable through a one-way clutch comprising a central boss projecting downwards from the turntable with a coiled spring wrapped around it and engaging it frictionally. The end of the spring is fixed to a driven member in the form of an annular gear wheel which surrounds the spring and drives the change-cycle mechanism. The direction of winding of the spring on the boss is such that when the turntable is rotated in its normal direction by a driving motor of the record changer, the frictional force of the boss on the spring tends to wind up the spring so that it is clamped firmly around the boss and the rotation of the boss is transmitted through the spring to the annular gear wheel and thence to the change-cycle mechanism, but if the turntable is inadvertently rotated by hand in an opposite direction, the turns of the spring are loosened so that the boss slips within the spring and the rotation is not transmitted.

In one form of automatic record changer, the change cycle mechanism, which performs the automatic record changing functions, is driven from the turntable which is itself rotated by the motor of the record changer. The drive to the change cycle mechanism is taken from the centre of the turntable, for example from a boss which is fixed on and projects downwards coaxially from the turntable.

The motor of the record changer, of course, only rotates the turntable in one direction, but the difficulty arises that if the turntable is accidentally turned manually in an opposite sense when removing records from it or at any other time, this counter-rotation which is transmitted to the change cycle mechanism tends to jam the mechanism and may damage it severly.

To overcome this problem, according to this invention, the turntable of an automatic record changer drives a change cycle mechanism through a one-way clutch comprising a driving member fixed coaxially to the turntable, a spring which is coiled around the driving member and grips it frictionally, and a driven member which extends around the spring and is fixed to one of its ends, the direction of winding of the spring on the driving member being such that when the turntable is rotated in its normal direction by the motor of the record changer, the frictional force of the driving member on the spring tends to wind up the spring so that it is clamped firmly around the driving member and the rotation of the driving member is transmitted to the spring and thence to the driven member and the change cycle mechanism, but rotation of the turntable in an opposite direction causing the turns of the spring to be loosened so that the driving member slips within the spring and the rotation is not transmitted if any resistance is met.

Preferably, the driving member is formed by a cylindrical part of a central boss projecting downwards from the turntable and the driven member is an annular gear wheel which surrounds the boss with a clearance space holding the spring between these two parts. In this way the one-way clutch can be incorporated without taking up any more space than was taken up in a previous form of mechanism in which the gear wheel formed an integral part of the boss.

Since counter-rotation of the turntable by hand causes the clutch to slip, no damage to the change cycle mechanism can result.

An example of an automatic record changer constructed in accordance with the invention is illustrated in the accompanying drawings in which.

Figure 1:
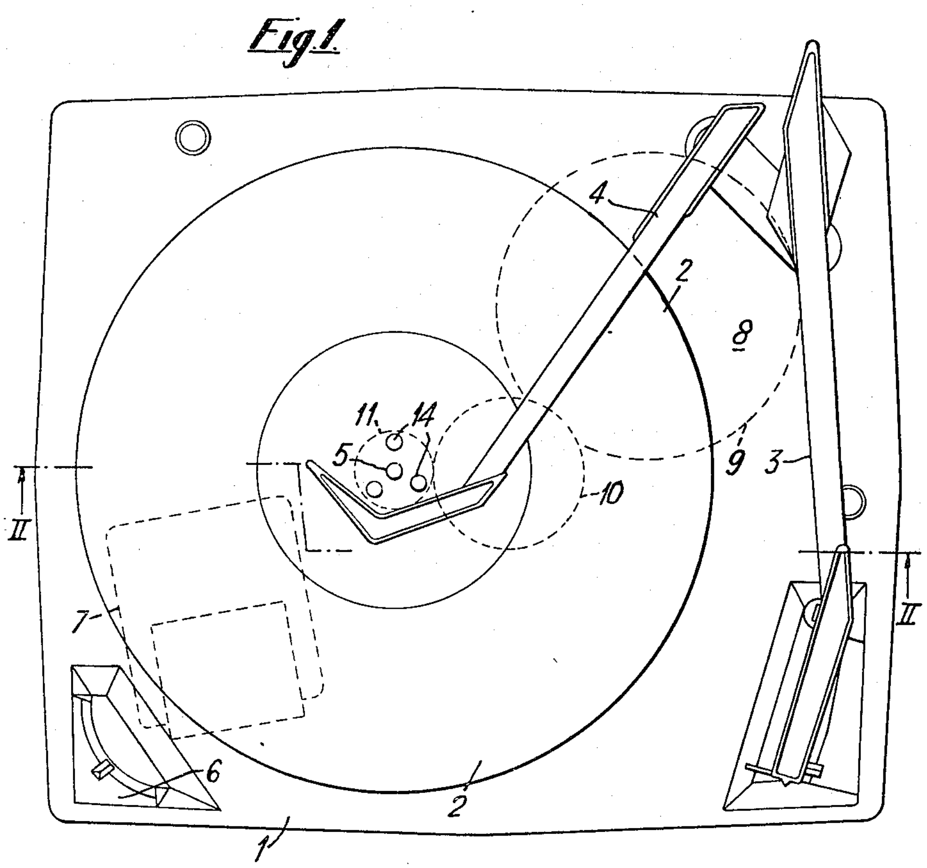
FIGURE 1 is a somewhat diagrammatic plan view.
Figure 2:
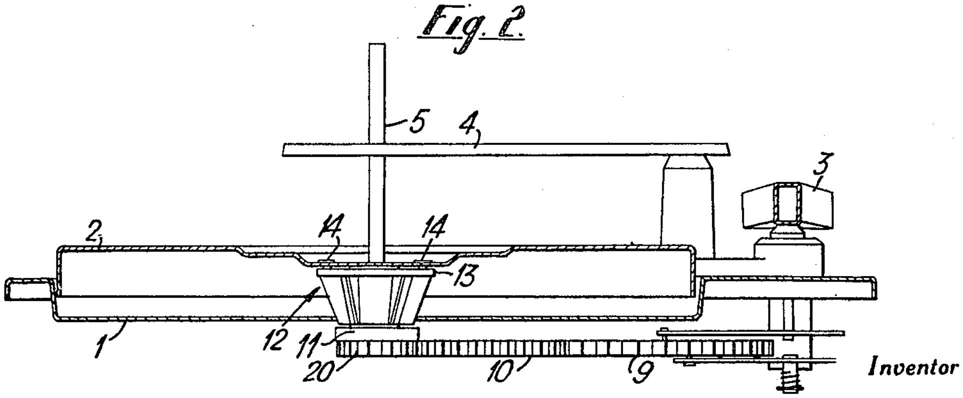
FIGURE 2 is a cross section as seen in the direction of the arrows on the line II—II in FIGURE 1.

As shown in FIGURES 1 and 2, the record changer has a base plate 1 which forms a chassis under or above which its various parts are supported. Above the base plate 1 is a turntable 2, a pickup arm 3, a steadying arm 4 which prevents disc records supported on a magazine spindle 5 from rocking, and a control 6 for altering the speed of rotation of the turntable 2.

Below the base plate 1 is an electric driving motor 7 which rotates the turntable 2 through a driving pulley and an idler wheel which are not shown, and a change cycle mechanism 8 having a toothed rim 9 which is driven by an intermediate gear wheel 10 which is itself driven by a driven clutch member 11 which is rotated through a clutch 12 having a driving member 13 driven by the turntable 2 to which it is fixed by rivets 14.

The change cycle mechanism 8 within the toothed rim 9 is conventional and will not therefore be described in further detail.

Figure 3:
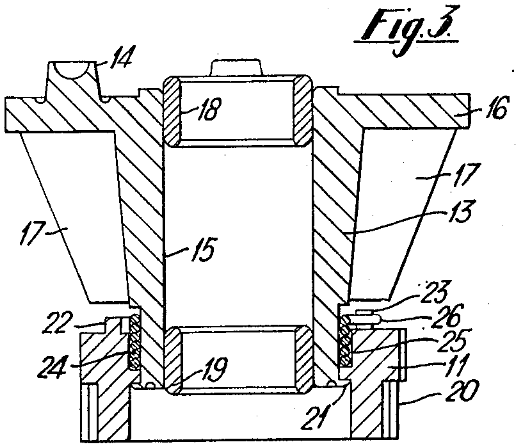
FIGURE 3 is a vertical cross section to a larger scale through the clutch forming part of the record changer shown in FIGURES 1 and 2; and, FIGURE 4 is an exploded perspective view of the main parts of the clutch shown in FIGURE 3.
Figure 4:
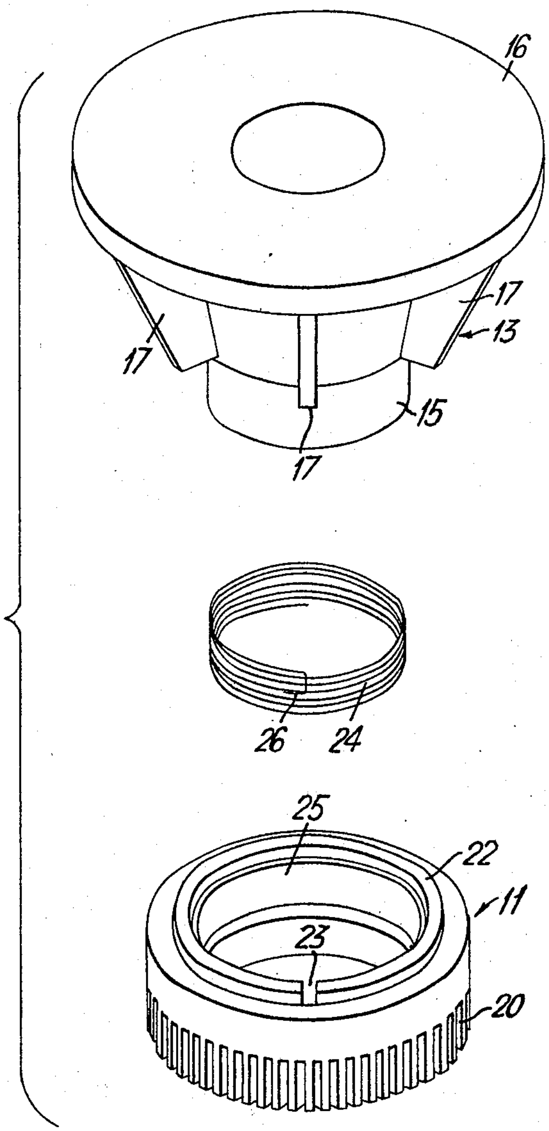

The clutch 12 with which the present invention is concerned, and through which the change cycle mechanism is driven from the turntable 2 is illustrated in detail in FIGURES 3 and 4 of the drawings. The driving clutch member 13 comprises a central tubular boss 15 with a radial flange 16 projecting from its upper end. The flange 16 and the boss 15 are further connected by webs 17 which, together with the boss 15 and flange 16 are formed as a single die casting. The rivets 14, one of which is shown in FIGURE 3, are also integrally die cast with the flange 16 and are pressed over after insertion through holes in the turntable 2.

Within the central tubular boss 15 are two bearing sleeves 18 and 19 by which the whole of the driving member 13 and with it the turntable 2 are rotatably supported from the magazine spindle 5. The magazine spindle 5 is itself indirectly supported from the base plate 1 by supports which are not shown.

The driven clutch member 11 which has teeth 20 meshing with the intermediate gear wheel 10 at its bottom end, surrounds the lower part of the tubular boss 15 on which it is rotatable. It is supported in this position by a small flange 21 which is formed integrally with and projects from the tubular boss 15 just outside the sleeve 19.

The driven clutch member 11 has an integrally formed ring 22 at its top end and this ring is formed with a slot 23. A coiled spring 24 which is wound in a clockwise direction as seen from below, lies in an annular groove 25 within the driven clutch member 11 and closely surrounds the tubular boss 15. The upper end of the spring 24 is formed with a hook 26 which engages in the slot 23.

The turntable 2 is rotated by the driving motor 7 in a clockwise direction as seen from above and rotates the driving clutch member 13 with it. As the tubular boss 15 thus rotates within the spring 24, it exerts a slight frictional drag on the spring 24 which tends to wind the spring 24 up and tighten its turns on the boss 15. This, after a very small rotation of the boss 15, causes the spring 24 to be bound tightly to it so that the spring 24 is also rotated. The hook 26 at the top end of the spring engaging in the slot 23 causes the driven clutch member to be rotated also. The driven clutch member 11 turns the toothed rim 9 of the change cycle mechanism through the teeth 20 and the intermediate gear wheel 10. The rotation of the toothed rim 9 causes the change cycle mechanism to operate only when playing of a record on the turntable 2 has been completed as is usual.

If the turntable 2 is rotated manually or in any other way in a counter-clockwise direction as seen from above, the frictional drag of the boss 15 on the spring 24 tends to cause the spring 24 to unwind so that it becomes looser on the boss 15 and in consequence the boss 15 slips within the spring and no rotation is transmitted to the driven clutch member 11. Thus, the toothed rim 9 of the change cycle mechanism is not rotated and no damage to the change cycle mechanism results from the counter-clockwise rotation of the turntable.

I claim:

1. In an automatic record changer including a turntable, means for rotating said turntable, a change cycle mechanism, and means drivingly connecting said turntable to said change cycle mechanism, the improvement wherein said connecting means includes a one-way clutch comprising a driving member, means fixing said driving member to said turntable for rotation therewith, a coiled spring coiled around said driving member and in frictional engagement therewith, a driven member extending around said spring and means fixing said driven member to one end of said spring, wherein the direction of winding of said spring on said driving member is such that when said turntable is rotated in a normal direction of rotation by said driving means, the frictional engagement between said driving member and said spring tends to wind up said spring so that it is clamped firmly around said driving member and the rotation of said driving member is transmitted to said spring and thence to said driven member and said change cycle mechanism, but rotation of the turntable in an opposite direction causing the turns of said spring to be loosened so that the driving member slips within said spring and said rotation is not transmitted.

2. An automatic record changer as claimed in claim 1, wherein said driving member comprises a central boss projecting downwards from said turntable, portions of said boss defining a cylindrical surface and said driven member comprises an annular gear wheel surrounding said boss with a clearance space between said gear wheel and said boss, said spring being mounted in said clearance space.

3. An automatic record changer as claimed in claim 1, wherein said change-cycle mechanism includes a toothed rim and said connecting means includes an intermediate gear wheel meshing with said annular gear wheel and said toothed rim.

4. An automatic record changer as claimed in claim 2, further comprising an integral ring at the upper end of said annular gear wheel, wall portions of said ring defining a slot, and a hook formed on the end of said spring, said spring engaging in said slot to attach said annular gear wheel to said spring.

5. An automatic record changer as claimed in claim 2, further comprising a flange projecting radially from the upper end of said boss and rivets fixing said flange to said turntable.

References Cited

UNITED STATES PATENTS

| | | | |
|---|---|---|---|
| 2,684,248 | 9/1954 | Jahncke | 274—10 |
| 2,730,221 | 1/1956 | Burt | 274—10 X |

HARRY N. HAROIAN, *Primary Examiner.*